(12) United States Patent
Yao

(10) Patent No.: US 7,056,988 B2
(45) Date of Patent: Jun. 6, 2006

(54) POLYMER COMPOUND, PROCESS FOR PRODUCING THE SAME, MOLDED ARTICLE AND PROCESS FOR PRODUCING THE SAME

(75) Inventor: Kenji Yao, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 413 days.

(21) Appl. No.: 10/014,566

(22) Filed: Dec. 14, 2001

(65) Prior Publication Data

US 2003/0094725 A1 May 22, 2003

(30) Foreign Application Priority Data

Jun. 14, 2001 (JP) ............................. 2001-180555

(51) Int. Cl.
C08L 67/00 (2006.01)
C08L 67/02 (2006.01)
C08L 67/03 (2006.01)
C08L 75/06 (2006.01)
C08L 77/12 (2006.01)

(52) U.S. Cl. ...................... 525/437; 525/438; 525/440; 525/444; 525/445; 526/266; 528/49; 528/73; 528/80; 528/81; 528/272; 528/288; 528/332; 528/341; 528/345; 528/354; 528/403; 528/405

(58) Field of Classification Search ............... 525/437, 525/438, 440, 444, 445; 526/266; 528/49, 528/80, 81, 272, 288, 332, 345, 354, 341, 528/403, 405, 73
See application file for complete search history.

(56) References Cited

U.S. PATENT DOCUMENTS

| | | | | |
|---|---|---|---|---|
| 5,498,651 A | * | 3/1996 | Brunelle | 524/176 |
| 5,648,454 A | * | 7/1997 | Brunelle | 528/491 |
| 6,369,157 B1 | * | 4/2002 | Winckler et al. | 524/783 |
| 6,414,103 B1 | * | 7/2002 | Correll et al. | 528/25 |
| 6,436,549 B1 | * | 8/2002 | Wang | 428/480 |
| 6,639,009 B1 | * | 10/2003 | Winckler et al. | 524/783 |
| 6,806,346 B1 | * | 10/2004 | Brugel | 528/354 |

* cited by examiner

Primary Examiner—Rabon Sergent
(74) Attorney, Agent, or Firm—Oliff & Berridge PLC

(57) ABSTRACT

A polymer compound contains a cyclic structure represented by the following general formula (1):

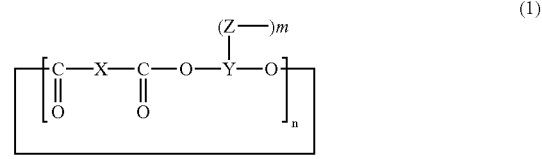

wherein each of X and Y represent an alkylene group or the like, where X and Y may be the same or different, Z represents a bond derived from an alkylene group or the like having from 1 to 20 carbon atoms, which is bonded to a group represented by Y belonging to another cyclic structure, m represents 0 or an integer of 1 or more and n represents an integer of 2 or more, provided that the integer represented by m is independent in respective repeating units, and a total number of the bond represented by Z is 1 or more.

14 Claims, 4 Drawing Sheets

POLYMER COMPOUND, PROCESS FOR PRODUCING THE SAME, MOLDED ARTICLE AND PROCESS FOR PRODUCING THE SAME

BACKGROUND OF THE INVENTION

1. Field of the Invention

The present invention relates to a polymer compound, a process for producing the same, a molded article and a process for producing the same.

2. Description of the Related Art

In recent years, developments have been earnestly carried out for a molded article, such as a functional film and a functional plate, containing a low molecular weight compound having a particular function dispersed in a polymer material. The molded article can be molded by coating a coating composition containing the raw materials dissolved or dispersed in a prescribed solvent on a substrate having such a form as a film form and a drum form. Therefore, it is excellent in mass productivity and is expected to have advantages in various fields, such as an electromagnetic wave shielding material, a near infrared ray shielding material and an electroconductive film.

It is important in the molded article that the functional material is uniformly dispersed in the polymer material. When the dispersion uniformity of the functional material is high, the objective function can be achieved in a high level and also the addition amount of the functional material can be decreased to improve the strength of the molded article.

In order to improve the dispersion uniformity of the functional material, various attempts have been made, for example, a dispersion method, such as high shear stress dispersion and multi-stage dispersion, is employed, and the species of the polymer material are selected. However, the improvement of the dispersion uniformity of the functional material is limited by these methods, and it is the current situation that a molded article is produced under the conditions where the fictional material can be relatively uniformly dispersed. Therefore, the resulting molded articles do not always have sufficient characteristics depending on the purpose thereof.

SUMMARY OF THE INVENTION

The invention has been developed under the circumstances. The inventors have completed the invention by finding the use of the polymer compound having the particular cyclic structure.

The invention provides, as one aspect, a polymer compound having a cyclic structure represented by the following general formula (1):

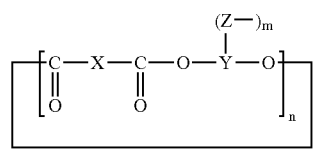

wherein X represents a group selected from the group consisting of an alkylene group, an arylene group, an arylalkylene group, an alkylarylene group, halogenated alkylene group and halogenated arylene group; Y represents a group selected from the group consisting of an alkylene group, an arylene group, an arylalkylene group, an alkylarylene group, a halogenated alkylene group and a halogenated arylene group; Z represents a bond derived from an alkylene group having from 1 to 20 carbon atoms, an ester group, a urethane group, an amide group or an ether group, which is bonded to a group represented by Y belonging to another cyclic structure; m represents 0 or an integer of 1 or more; and n represents an integer of 2 or more, provided that the integer represented by m is independent in respective repeating units, and a total number of the bond represented by Z is 1 or more.

It is preferred in the polymer compound of the invention that the cyclic structure is represented by the following general formula (2):

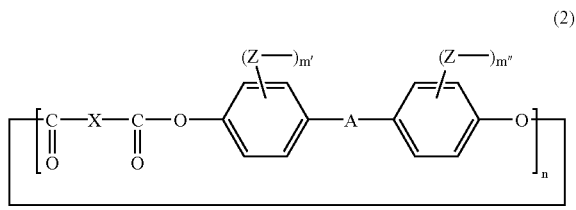

wherein X and A are the same as or different from each other and each represents a group selected from the group consisting of an alkylene group, an arylene group, an arylalkylene group, an alkylarylene group, halogenated alkylene group and halogenated arylene group; Z represents a bond derived from an alkylene group having from 1 to 20 carbon atoms, an ester group, a urethane group, an amide group or an ether group, which is bonded to a group represented by Y belonging to another cyclic structure; m' and m" each represents an integer of from 0 to 4; and n represents an integer of 2 or more, provided that the integers represented by m' and m" each is independent in respective repeating units, and a total number of the bond represented by Z is 1 or more.

The invention provides, as another aspect, a process for producing a polymer compound contains the steps of:

subjecting a raw material mixture to esterification or ester exchange to obtain a composite (first step), the raw material mixture containing a compound represented by the following general formula (3):

wherein X represents a group selected from the group consisting of an alkylene group, an arylene group, an arylalkylene group, an alkylarylene group, halogenated alkylene group and halogenated arylene group; and R represents a group selected from the group consisting of a hydrogen atom and a hydrocarbon group, and a compound represented by the following general formula (4):

wherein Y represents a group selected from the group consisting of an alkylene group, an arylene group, an arylalkylene group, an alkylarylene group, halogenated alkylene group and halogenated arylene group; Z' represents a reactive group capable of forming a group selected from the group consisting of an alkenyl group, an ester group, a urethane group, an amide group and an ether group; and k represents an integer of 1 or more, subjecting the composite to a polycondensation reaction under reduced pressure (second step) to obtain a cyclic oligomer represented by the following general formula (5):

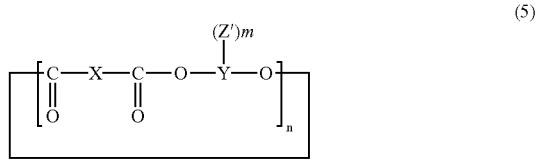

(5)

wherein X represents a group selected from the group consisting of an alkylene group, an arylene group, an arylalkylene group, an alkylarylene group, halogenated alkylene group and halogenated arylene group; Y represents a group selected from the group consisting of an alkylene group, an arylene group, an arylalkylene group, an alkylarylene group, a halogenated alkylene group and a halogenated arylene group; Z' represents a reactive group capable of forming a group selected from the group consisting of an alkenyl group, an ester group, a urethane group, an amide group and an ether group; m represents 0 or an integer of 1 or more; and n represents an integer of 2 or more, provided that the integer represented by m is independent in respective repeating units, and a total number of the bond represented by Z' is 1 or more, and reacting the oligomer (third step) to obtain a polymer compound having a cyclic structure represented by the following general formula (1):

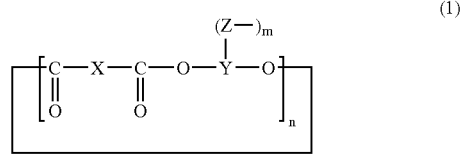

(1)

wherein X represents a group selected from the group consisting of an alkylene group, an arylene group, an arylalkylene group, an alkylarylene group, halogenated alkylene group and halogenated arylene group; Y represents a group selected from the group consisting of an alkylene group, an arylene group, an arylalkylene group, an alkylarylene group, a halogenated alkylene group and a halogenated arylene group; Z represents a bond derived from an alkylene group having from 1 to 20 carbon atoms, an ester group, a urethane group, an amide group or an ether group, which is bonded to a group represented by Y belonging to another cyclic structure; m represents 0 or an integer of 1 or more; and n represents an integer of 2 or more, provided that the integer repented by m is independent in respective repeating units, and a total number of the bond represented by Z is 1 or more.

The invention provides, as a further aspect, a molded article containing the polymer compound of the invention.

It is preferred in the molded article of the invention that the molded article is produced by extrusion molding or coating. It is also preferred that the molded article further contains a functional material having a molecular weight of 3,000 or less, and it is more preferred that the functional material exhibits electroconductivity or wavelength-selective absorbance.

The invention further provides, as a further aspect, a process for producing a molded article containing the steps of melting the polymer compound of the invention, and subjecting the molten polymer compound to extrusion molding in a prescribed mold.

The invention still further provides, as a further aspect, a process for producing a molded article containing the steps of coating a coating composition containing the polymer compound of the invention on a prescribed substrate, and drying the coating composition thus coated.

It is preferred in the process for producing a molded article of the invention that the coating composition further contains a functional material having a molecular weight of 3,000 or less, and it is more preferred that the functional material exhibits electroconductivity or wave-selective absorbance.

DESCRIPTION OF THE PREFERRED EMBODIMENTS

Figure 1:
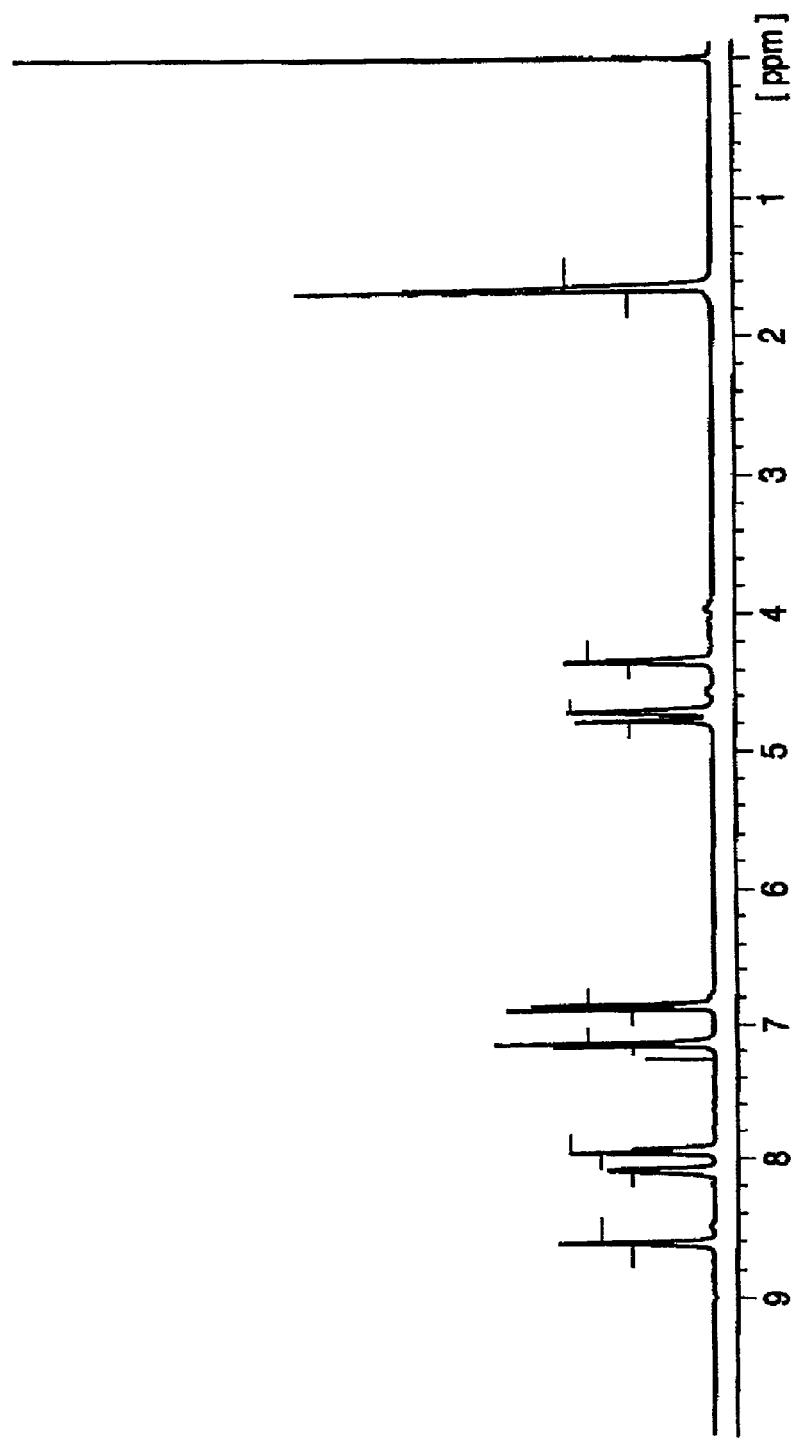
FIG. 1 is a graph showing an $^1$H-NMR spectrum of a polymer compound obtained in Example 1.

Preferred embodiments of the invention will be described in detail below.

Polymer Compound

The polymer compound of the invention has a cyclic structure represented by the following general formula (1), and it is excellent in mechanical strength and has such a capability that a functional material is sufficiently uniformly dispersed therein:

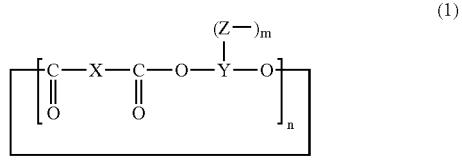

(1)

In the general formula (1), X represents a group selected from the group consisting of an alkylene group (preferably an alkylene group having from 1 to 20 carbon atoms), an arylene group (preferably an arylene group having from 6 to 14 carbon atoms), an arylalkylene group (preferably an arylalkylene group having from 7 to 20 carbon atoms), an alkylarylene group preferably an alkylarylene group having from 7 to 20 carbon atoms), a halogenated alkylene group (preferably a halogenated alkylene group having from 1 to 20 carbon atoms) and a halogenated arylene group (a halogenated arylene group having from 6 to 14 carbon atoms). Preferred examples of the group represented by X are shown in Table 1 below. The plural groups represented by X in the general formula (1) may be the same as or different from each other.

TABLE 1

| No. | Structural formula | No. | Structural formula | No. | Structural formula |
|---|---|---|---|---|---|
| 1-1 | (benzene ring) | 1-2 | (naphthalene) | 1-3 | (anthracene) |
| 1-4 | (cyclohexane) | 1-5 | (cyclopentane) | 1-6 | (bicyclic) |
| 1-7 | —$C_2H_4$— | 1-8 | —$C_3H_6$— | 1-9 | —$C_4H_8$— |
| 1-10 | —$C_5H_{10}$— | 1-11 | —$C_6H_{12}$— | 1-12 | —$C_7H_{14}$— |
| 1-13 | —$C_8H_{16}$— | 1-14 | —$C_9H_{18}$— | 1-15 | —$C_{10}H_{20}$— |
| 1-16 | —$CH_2$—$CH(CH_3)$— | 1-17 | —$CH_2$—$C(CH_3)_2$— | 1-18 | —$H_2C$—$C(CH_3)_2$—$CH_2$— |

In the general formula (1), Y represents a group selected from the group consisting of an alkylene group (preferably an alkylene group having from 1 to 20 carbon atoms), an arylene group (preferably an arylene group having from 6 to 14 carbon atoms), an arylalkylene group (preferably an arylalkylene group having from 7 to 20 carbon atoms), an alkylarylene group (preferably an alkylarylene group having from 7 to 20 carbon atoms), a halogenated alkylene group (preferably a halogenated alkylene group having from 1 to 20 carbon atoms) and a halogenated arylene group (a halogenated arylene group having from 6 to 14 carbon atoms). Preferred examples of the group represented by Y are shown in Tables 2 and 3 below. In Tables 2 and 3, $Z_1$ and $Z_2$ are also shown as the group representing Z. The plural groups represented by Y in the formula (1) may be the same as or different from each other.

TABLE 2

| No. | Structural formula | No. | Structural formula |
|---|---|---|---|
| 2-1 | | 2-2 | —CH($Z_1$)—$C_2H_4$—CH($Z_2$)— |
| 2-3 | —$CH_2$—CH($Z_1$)—CH($Z_2$)—$CH_2$— | 2-4 | —$CH_2$—CH($Z_1$)—$C_2H_4$—$CH_2$—CH($Z_2$)—$CH_2$— |
| 2-5 | (cyclohexane with $Z_1$, $Z_2$) | 2-6 | —$H_2C$—(cyclohexane with $Z_1$, $Z_2$)—$CH_3$ |
| 2-7 | (bicyclic with $Z_1$, $Z_2$) | 2-8 | (bicyclic with $Z_1$, $CH_2$—$Z_2$, —$H_2C$) |
| 2-9 | (benzene with $Z_1$, $CH_2$—, —$H_2C$, $Z_2$) | 2-10 | (naphthalene with $Z_1$, $CH_2$—, —$H_2C$, $Z_2$) |

TABLE 2-continued

| No. | Structural formula | No. | Structural formula |
|---|---|---|---|
| 2-11 | (naphthalene with -H$_2$C- and -CH$_2$- substituents, and Z$_1$, Z$_2$ substituents) | 2-12 | -C$_2$H$_5$O-C$_6$H$_3$(Z$_1$)-C(CH$_3$)$_2$-C$_6$H$_3$(Z$_2$)-OC$_2$H$_5$- |

TABLE 3

| No. | Structural formula | No. | Structural formula |
|---|---|---|---|
| 2-13 | -C$_2$H$_5$O-C$_6$H$_3$(Z$_1$)-C(cyclohexyl)-C$_6$H$_3$(Z$_2$)-OC$_2$H$_5$- | 2-14 | -C$_2$H$_5$O-C$_6$H$_2$(Z$_2$)(CH$_3$)-C(CH$_3$)$_2$-C$_6$H$_2$(CH$_3$)(Z$_1$)-OC$_2$H$_5$- |
| 2-15 | -C$_2$H$_5$O-C$_6$H$_2$(CH$_3$)(Z$_2$)-C(cyclohexyl)-C$_6$H$_2$(Z$_1$)(CH$_3$)-OC$_2$H$_5$- | 2-16 | -C$_2$H$_5$O-C$_6$H$_3$(Z$_2$)-CH$_2$-C$_6$H$_4$-OC$_2$H$_5$- |
| 2-17 | -C$_2$H$_5$O-C$_6$H$_2$(CH$_3$)(Z$_2$)-CH$_2$-C$_6$H$_2$(Z$_1$)(CH$_3$)-OC$_2$H$_5$- | 2-18 | -C$_2$H$_5$O-C$_6$H$_3$(Z$_1$)-C(CH$_3$)(CH(CH$_3$)CH=CH$_2$... actually CH$_3$-CH=CH$_3$ branch)-C$_6$H$_3$(Z$_2$)-OC$_2$H$_5$- |
| 2-19 | -C$_2$H$_5$O-C$_6$H$_3$(Z$_1$)-C(CH$_3$)(phenyl)-C$_6$H$_3$(Z$_2$)-OC$_2$H$_5$- | 2-20 | -C$_2$H$_5$O-C$_6$H$_3$(Z$_1$)-C(phenyl)$_2$-C$_6$H$_3$(Z$_2$)-OC$_2$H$_5$- |
| 2-21 | -C$_2$H$_5$O-C$_6$H$_3$(Z$_2$)-C(CH$_3$)(biphenyl)-C$_6$H$_3$(Z$_1$)-OC$_2$H$_5$- | 2-22 | -C$_2$H$_5$O-C$_6$H$_3$(Z$_2$)-C(=O)-C$_6$H$_3$(Z$_1$)-OC$_2$H$_5$- |

TABLE 3-continued

| No. | Structural formula | No. | Structural formula |
|---|---|---|---|
| 2-23 | | 2-24 | |
| 2-25 | | 2-26 | |

In the general formula (1), Z represents a bond derived from an alkylene group having from 1 to 20 carbon atoms, an ester group, a urethane group, an amide group or an ether group, which is bonded to a group represented by Y belonging to another cyclic structure, m represents 0 or an integer of 1 or more, and n represents an integer of 2 or more.

The integer represented by m herein is independent in respective repeating units constituting the cyclic structure represented by the general formula (1). In other words, the cyclic structure may be constituted with only a repeating unit having a group represented by Y having a bond represented by Z (hereinafter referred to as a repeating unit 1), or in alternative it may be constituted with both the repeating unit 1 and a repeating unit having a group represented by Y having no bond represented by Z (hereinafter referred to as a repeating unit 2). It is necessary that the total number of the bond represented by Z is 1 or more. In the case where the cyclic structure is constituted with both the repeating unit 1 and the repeating unit 2, the form of polymerization may be either block copolymerization or random copolymerization.

The plural groups represented by X contained in the cyclic structure may be the same as or different from each other per the repeating units. In other words, the cyclic structure may be constituted with only repeating units having the same groups represented by X or in alternative, it may be constituted with two or more kinds of repeating units having different groups represented by X. Similarly, the groups Y and the bonds Z may be the same as or different from each other per the repeating units.

In the cyclic structure, that represented by the following general formula (2) is particularly preferred from the standpoint of mechanical strength and production suitability:

(2)

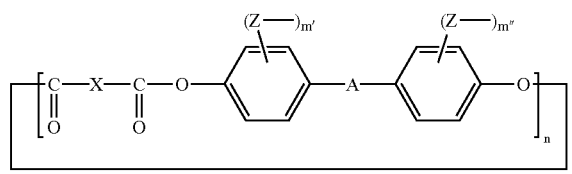

wherein X and A are the same as or different from each other and each represents a group selected from the group consisting of an alkylene group, an arylene group, an arylalkylene group, an alkylarylene group, halogenated alkylene group and halogenated arylene group; Z represents a bond derived from an alkylene group having from 1 to 20 carbon atoms, an ester group, a urethane group, an amide group or an ether group, which is bonded to a group represented by Y belonging to another cyclic structure; m' and m" each represents an integer of from 0 to 4; and n represents an integer of 2 or more, provided that the integers represented by m' and m" each is independent in respective repeating units, and a total number of the bond represented by Z is 1 or more.

The weight average molecular weight of the polymer compound of the invention is not particularly limited, and is preferably from 10,000 to 500,000, and more preferably from 50,000 to 300,000. When the weight average molecular weight is less than the preferred lower limit, there is a tendency that the mechanical strength becomes insufficient. When the weight average molecular weight exceeds the preferred upper limit, there is a tendency that the solubility to solvents and flowability are lowered to make the molding property insufficient.

In the polymer compound of the invention having the foregoing constitution, the cyclic structures represented by the general formula (1) are connected to each other through the bonds represented by Z, and therefore it exhibits excellent mechanical strength. Furthermore, the polymer compound of the invention has a large free volume of the molecule and suffers no entanglement of molecular chains as different from linear polymer compounds, and therefore considerably high solubility in solvents and a low melt viscosity upon heating. As a result, good melt molding property can be realized upon, for example, injection molding and extrusion molding.

The polymer compound of the invention has such a capability that a functional material can be sufficiently uniformly dispersed therein, and therefore it is particularly useful as a polymer material for a molded article, such as an electromagnetic wave shielding material, a near infrared ray shielding material and an electroconductive film.

While the reason why dispersion uniformity of a functional material is improved by tie polymer compound of the invention is not completely clear, it is considered that this is because when a functional material is mixed with the polymer compound of the invention, the functional material is retained in voids of the cyclic structures represented by the general formula (1).

Process for Producing Polymer Compound

In the process for producing a polymer compound according to the invention, a raw material mixture containing a compound represented by the following general formula (3):

and a compound represented by the following general formula (4):

is subjected to esterification or ester interchange to obtain a composite (first step).

In the general formulae (3) and (4), X and Y have the same meanings as X and Y in the general formula (1). R in the general formula (3) represents a group selected from the group consisting of a hydrogen atom and a hydrocarbon group, and preferably a hydrogen atom or an alkyl group having from 1 to 3 carbon atoms.

Z' in the general formula (4) represents a reactive group capable of forming a group selected from the group consisting of an alkenyl group, an ester group, a urethane group, an amide group and an ether group, and k represents an integer of 1 or more. That is, the reactive group represented by Z' is a group capable of becoming a reactive site upon reacting cyclic oligomers described later. Preferred examples of the reactive group represented by Z' are shown in Table 4. In the case where the bond is formed with only one kind of the reactive groups, Z' in the general formula (4) represents one kind of a group solely. In the case where the bond is formed with two kinds of the reaction groups, such as an ester bond, a combination of two or more kinds of the reactive groups is applied.

TABLE 4

| No. | Structural formula | No. | Structural formula | No. | Structural formula |
|---|---|---|---|---|---|
| 3-1 | —CH=CH$_2$ | 3-2 | —OH | 3-3 | —NH$_3$ |
| 3-4 | —C(=O)—OH | 3-5 | —C(=O)—Cl | 3-6 | —N=C=O |
| 3-7 | —SiH$_2$—OCH$_3$ | 3-8 | —SiH(OCH$_3$)(OCH$_3$) | 3-9 | —Si(OCH$_3$)(OCH$_3$)OCH$_3$ |

The raw material mixture used in the first step may be formed with a compound represented by the general formula (3) and a compound represented by the general formula (4). In this case, a cyclic oligomer, in which all the groups represented by Y are bonded to Z' in the general formula (5), is obtained. The raw material mixture may further contain, in addition to the compounds represented by the general formulae (3) and (4), a compound represented by the following general formula (6):

HO—Y—OH (6)

wherein Y has the same meaning as in the general formula (1).

The mixing ratio of the compound represented by the general formula (3) and the compound represented by the general formula (4) is not particularly limited, and it is preferred that from 1 to 2.5 mol of the compound represented by the general formula (4) is mixed with 1 mol of the compound represented by the general formula (3) because there is a tendency that the yield of the objective polymer compound is improved.

Upon carping out esterification or ester interchange, it is preferred to use a metallic oxide, such as zinc oxide and antimony trioxide, a metallic acetate, such as calcium acetate and zinc acetate, and tetrabutoxysilane as a catalyst. The using amount of the catalyst varies depending on the structure of the objective polymer compound, and in the case where a metallic oxide is used, for example, the using amount is preferably from 0.0005 mol to 0.1 mol per 1 mol of a dicarboxylic acid or an ester (including the compound represented by the general formula (3)) or from 0.0001 mol to 0.1 mol per 1 mol of a diol (including the compound represented by the general formulae (4) and (6)). In the case where a metallic acetate is used, the using amount thereof is preferably from 0.001 mol to 0.3 mol per 1 mol of a dicarboxylic acid or an ester (including the compound represented by the general formula (3)) or from 0.0002 mol to 0.3 mol per 1 mol of a diol (including the compound represented by the general formulae (4) and (6)). When the using amount of the catalyst is less than the lower limits, a linear oligomer having a relatively large molecular weight is liable to be formed upon esterification or ester exchange, so as to bring about a tendency that the yield of the cyclic oligomer in the subsequent step is lowered.

The reaction temperature upon esterification or ester exchange is preferably from 150° C. to 200° C. When the reaction temperature exceeds the upper limit, a linear oligomer having a relatively large molecular weight is liable to be formed upon esterification or ester exchange, so as to bring about a tendency that the yield of the cyclic oligomer in the subsequent step is lowered. When the reaction temperature is lower than the lower limit, there is a tendency that the reaction efficiency becomes insufficient. It is preferred upon reaction that the raw material mixture is gradually heated to a temperature within the foregoing range under stirring.

Along with the progress of the reaction, water or an alcohol is formed as a by-product upon esterification or ester exchange, respectively. The by-product can be distilled off from the reaction system, whereby the end point of the reaction can be confirmed.

The composite obtained in the first step is subjected to a polycondensation reaction under reduced pressure to obtain a cyclic oligomer represented by the following general formula (5) (second step):

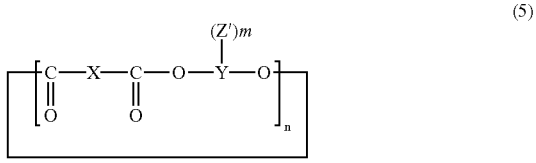

(5)

X, Y and Z' in the general formula (5) have the same meanings as X, Y and Z' in the general formulae (3) and (4) and n represents an integer of 2 or more.

In the general formula (5), m represents 0 or an integer of 1 or more, provided that the integer represented by m is independent in respective repeating units constituting the cyclic oligomer, and a total number of the bond represented by Z' in the general formula (5) is 1 or more. For example, in the case where the raw material mixture is formed with a compound represented by the general formula (3) and a compound represented by the general formula (4), the cyclic oligomer is constituted the second step, it is considered that such a reaction mechanism is dominant that a dicarboxylic acid and a diol are combined at a molar ratio of 1/1 in the first step, to form a composite further having the esterification catalyst or the ester exchange catalyst coordinated thereto, and the polymerization catalyst acts on the composite to form the cyclic oligomer in the second step. Therefore, it is considered that the yield of the cyclic oligomer is increased associated with the increase of the amount of the polymerization catalyst.

Upon carrying out the polycondensation reaction of the composite, an antioxidant may be added depending on necessity. Specific examples of the antioxidant include a phosphorous compound, such as trimethylphosphoric acid and triethylphosphoric acid. The addition amount of the antioxidant is preferably from 0.0001 mol to 0.001 mol per 1 mol of the cyclic oligomer.

The polycondensation reaction of the composite is carried out under reduced pressure, and the pressure thereon is preferably 1 Torr or less. The reaction temperature on the polycondensation reaction of the composite is preferably from 200° C. to 240° C., and more preferably from 210° C. to 230° C. When the reaction temperature exceeds the upper limit, a linear oligomer is liable to be formed to bring about a tendency that the yield of the cyclic oligomer is lowered. When the reaction temperature is less than the lower limit, there is a tendency that the reaction efficiency becomes insufficient. It is preferred upon carrying out the reaction that heating and reduction of pressure are gradually carried out to the temperature and the pressure within the foregoing ranges under stirring (preferably over a period of from 1 to 2 hours).

The end point of the polycondensation reaction can be detected by a torque value of stirring as an index. After completing the reaction, the content is dissolved only with repeating units having m of 1 or more. In the case where the raw material mixture further contains a compound represented by the general formula (6), the cyclic oligomer is constituted with repeating units having m of 0 and repeating units having m of 1 or more. In the case where the cyclic oligomer is constituted with two or more kinds of repeating units having different structures, the form of polymerization may be either block copolymerization or random copolymerization.

Upon carrying out the polycondensation reaction of the composite, it is preferred to use a metallic oxide, such as germanium oxide, zinc oxide and antimony trioxide, and tetrabutoxysilane as a polymerization catalyst. The using amount of the polymerization catalyst is appropriately selected depending on the structure of the cyclic oligomer and the species of the catalyst, and in the case where a metallic oxide is used, for example, the using amount thereof is preferably from 0.001 mol to 0.3 mol per 1 mol of the composite. When the using amount of the polymerization catalyst is lower than the lower limit, a linear oligomer having a relatively large molecular weight is liable to be formed upon esterification or ester exchange, so as to bring about a tendency that the yield of the cyclic oligomer in the subsequent step is lowered. When the using amount of the polymerization catalyst is lower than the lower limit, there is a tendency that a linear oligomer is liable to be formed, but the yield of the cyclic oligomer is decreased. When the using amount of the catalyst exceeds the upper limit, on the other hand, there is a tendency that the yield cannot be increased corresponding to the increased using amount.

While it is not completely clear why the yield of the cyclic oligomer is increased when the using amount of the polymerization catalyst is in the foregoing range, it is considered as follows. In the case where an esterification catalyst or an ester exchange catalyst is used in the first step, and a polymerization catalyst is used in in a solvent, such as tetrahydrofurn (THF), and fractionated by, for example, liquid chromatography to isolate the objective cyclic oligomer.

Furthermore, the cyclic oligomers represented by the general formula (5) are reacted to obtain the polymer compound having a cyclic structure represented by the following general formula (1) according to the invention (third step).

The reaction of the cyclic oligomers can be preferably carried out by using a prescribed polymerization initiator. The species of the polymerization initiator is appropriately selected depending on the group represented by Z' in the general formula (5). In the case where the group represented by Z' is a vinyl group, radical polymerization can be carried out by using 2,2-azobisisobutyronitrile to obtain a polymer compound having the cyclic structures bonded to each other through carbon-carbon bonds. In the case where the group represented by Z' is a combination of a haloformyl group (such as a chloroformyl group) and a hydroxyl group, interfacial polycondensation is carried out by using triethylamine to obtain a polymer compound having the cyclic structures bonded to each other though ester bonds.

In the production process of the invention, because polycondensation reaction (such as an esterification reaction or an ester exchange reaction) is carried out in the first and second steps, it is preferred that the group represented by Z' is a radical polymerizable group, such as a vinyl group, whereby side reactions in the first and second step are easily and certainly suppressed.

In the case where the group represented by Z' exhibits capability of polycondensation, such as an ester group, it is preferred that the group represented by Z' in the general formula (4) is previously converted to a protected group by using, for example, a chloride. That is, melt polycondensation is carried out upon forming the cyclic oligomer, and interfacial polycondensation is carried out upon reacting the cyclic oligomers, whereby the objective polymer compound can be preferably obtained.

Molded Article and Process for Producing Same

The molded article of the invention contains the polymer compound of the invention and is excellent in mechanical strength and molding property. Therefore, the molded article of the invention is extremely useful in various fields including automobile parts, vehicle parts and aircraft parts.

The molded article of the invention can be imparted with prescribed characteristics by dispersing a functional material in the polymer compound of the invention. The polymer compound of the invention can sufficiently uniformly disperse the functional material owing to the high dispersion uniformity thereof, and even when the addition amount of the functional material is smaller than conventional molded articles, such characteristics can be exerted that are equivalent to or larger than those of the conventional molded articles.

As the functional material, such compounds that exhibit wavelength-selective absorbance (such as electromagnetic wave absorbance and near infrared ray absorbance) and electroconductivity can be used. Specific examples of the compound exhibiting wavelength-selective absorbance include a dimmonium compound, a naphthalocyanine compound, an azo compound and a phthalocyanine compound. Examples of the compound exhibiting electroconductivity include metallic particles, such as gold and silver, a metallic oxide, such as titanium oxide and zinc oxide, an indium-tin oxide alloy, an electroconductive polymer, such as polyacetylene, polyaniline and polyacene, and liquid crystal molecules, such as octylcyanobiphenyl.

The molecular weight of the functional material is preferably 3,000 or less, and more preferably from 50 to 2,000. When the molecular weight of the functional material is in the range, higher dispersion uniformity can be obtained to result in such a tendency that characteristics and productivity of the molded article are improved, and in particular, it is remarkably effective upon imparting wavelength-selective absorbance or electroconductivity. In an electromagnetic wave shielding material and a near infrared ray shielding material when the dispersion uniformity of the functional material is insufficient, there are some cases that the ray is transmitted at a part where the distribution of the functional material is nondense to fail to obtain sufficient characteristics. When a functional material having a molecular weight of 3,000 or more is used, on the other hand, the functional material is dispersed to have substantially the same distances among the dispersed domains to result in such a tendency that higher wavelength-selective absorbance can be obtained. In the case of the electroconductive molded article, when a functional material having a molecular weight of 3,000 or less is used, the functional material is dispersed to have substantially the same distances among the dispersed domains to result in such a tendency that higher electroconductivity can be obtained.

As described in the foregoing, in the case where the molded article of the invention contains a functional material, it is effective in various purposes including a near infrared ray absorbing panel for preventing malfunction of a remote controller of a plasma display, a heat absorption cover for building materials, aircraft, trains and automobiles, and an electromagnetic wave shielding cover, a color filter, a light scattering prevention film, an antireflection film, a retardation film, a liquid crystal orientation film, a transparent electrode film, a light waveguide and an optical fiber for various sensors, home electric appliances and portable telephones.

The molded article of the invention can be obtained by injection molding, injection compression molding, extrusion molding, cast molding, coating molding and dipping molding. Among these, such methods including cast coating, coating molding and dipping molding are preferred that a coating composition obtained by dispersing or dissolving the polymer compound and a functional material, which is mixed depending on necessity, in a prescribed solvent is coated on a prescribed substrate, followed by drying. Particularly, in the case where a functional material is used the use of the preferred methods is effective because the function material is uniformly and stably retained in the cyclic structures of the polymer compound of the invention owing to the solubility of the polymer compound in the solvent.

The solvent used in the invention is not particularly limited as far as it can dissolve the polymer compound of the invention, and specific examples thereof include an alcohol, such as methanol, ethanol, isopropanol and n-butanol, a ketone, such as acetone, methyl ethyl ketone and cyclohexanone, an ether, such as tetrahydrofuran, dioxane, ethylene glycol monomethyl ether and diethyl ether, a halogenated fatty hydrocarbon, such as chloroform, dichloromethane, dichloroethane, carbon tetrachloride and trichloroethylene, an amide, such as N,N-dimethylformamide and N,N-dimethylacetamide, an ester, such as methyl acetate, ethyl acetate and n-butyl acetate, and an aromatic compound, such as benzene, toluene, xylene, monochlorobenzene and dichlorobenzene. These solvents may be used solely or as a mixture of two or more of them. It is preferred to add a slight amount of a leveling agent, such as a silicone oil, to the coating composition to improve the surface smoothness of the resulting molded article.

The invention will be described in more detail with reference to the following examples, but the invention is not construed as being limited to the examples.

EXAMPLE 1

1 mol of dimethyl 2,6-naphthalenedicarboxylate, 0.7 mol of a diol represented by the following structural formula (7), 0.07 mol of a vinyl-substituted diol represented by the following structural formula (8), 1.8 mol of ethylene glycol and 0.001 mol of calcium acetate are placed in a 1 L autoclave. After raising the inner temperature to 130° C., it is confirmed that the contents can be stirred by hand, and then stirring is started at 150 rpm.

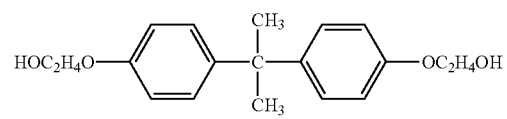

(7)

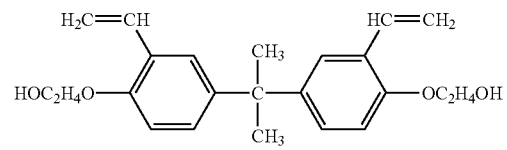

(8)

When the inner temperature is raised at 30° C./hr, methanol is started to be distilled off around 150° C. It is confirmed that 98% of the theoretical amount of methanol is distilled off at 240°°C., so as to complete the ester interchange reaction.

0.002 mol of germanium oxide and 0.001 mol of triethylphosphoric acid are added to the contents after the reaction, and the temperature is raised from 200° C. at 15° C./hr to 240° C. over 2 hours while stirring at 100 rpm. At this time, the pressure inside the autoclave is decreased to 0.4

Torr over 2 hours. Stirring is further continued at 270° C. at 0.4 Torr for 1 hour to complete the reaction.

The contents are cooled to room temperature, to which 1 L of tetrahydrofuran is added and stirred to dissolve them. The resulting solution is added dropwise to methanol, and a solid content thus obtained is filtered off. A cyclic oligomer is separated from the resulting crude product by using a liquid chromatography mass analyzer (LCMS-prepSTAR, produced by Shimadzu Corp.). The yield is 25 g.

Figure 2:
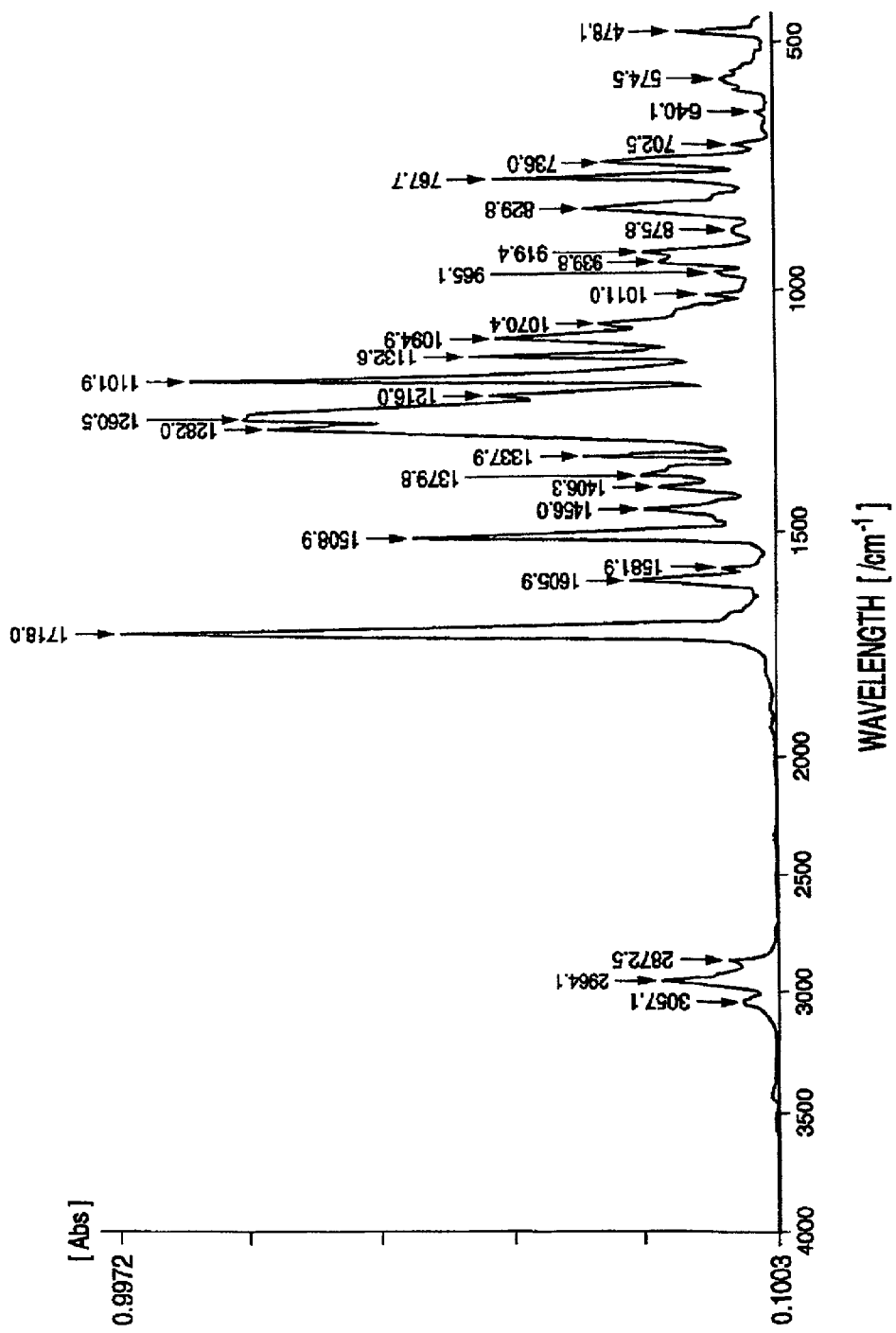
FIG. 2 is a graph showing an IR spectrum of a polymer compound obtained in Example 1.

The entire cyclic oligomer thus obtained is dissolved in 200 ml of methylene chloride, to which 0.0001 mol of bisisobutylnitrile is added, and the solution is stirred under a nitrogen atmosphere at 20° C. and 200 rpm for 15 hours. The content is added dropwise to 3 L of methanol, and a solid content thus obtained is filtered off. The resulting crude product is dried in vacuum at 70° C. for 15 hours to obtain the objective polymer compound. The $H^1$-NMR spectrum and the IR spectrum of the resulting polymer compound are shown in FIGS. 1 and 2, respectively.

Figure 3:
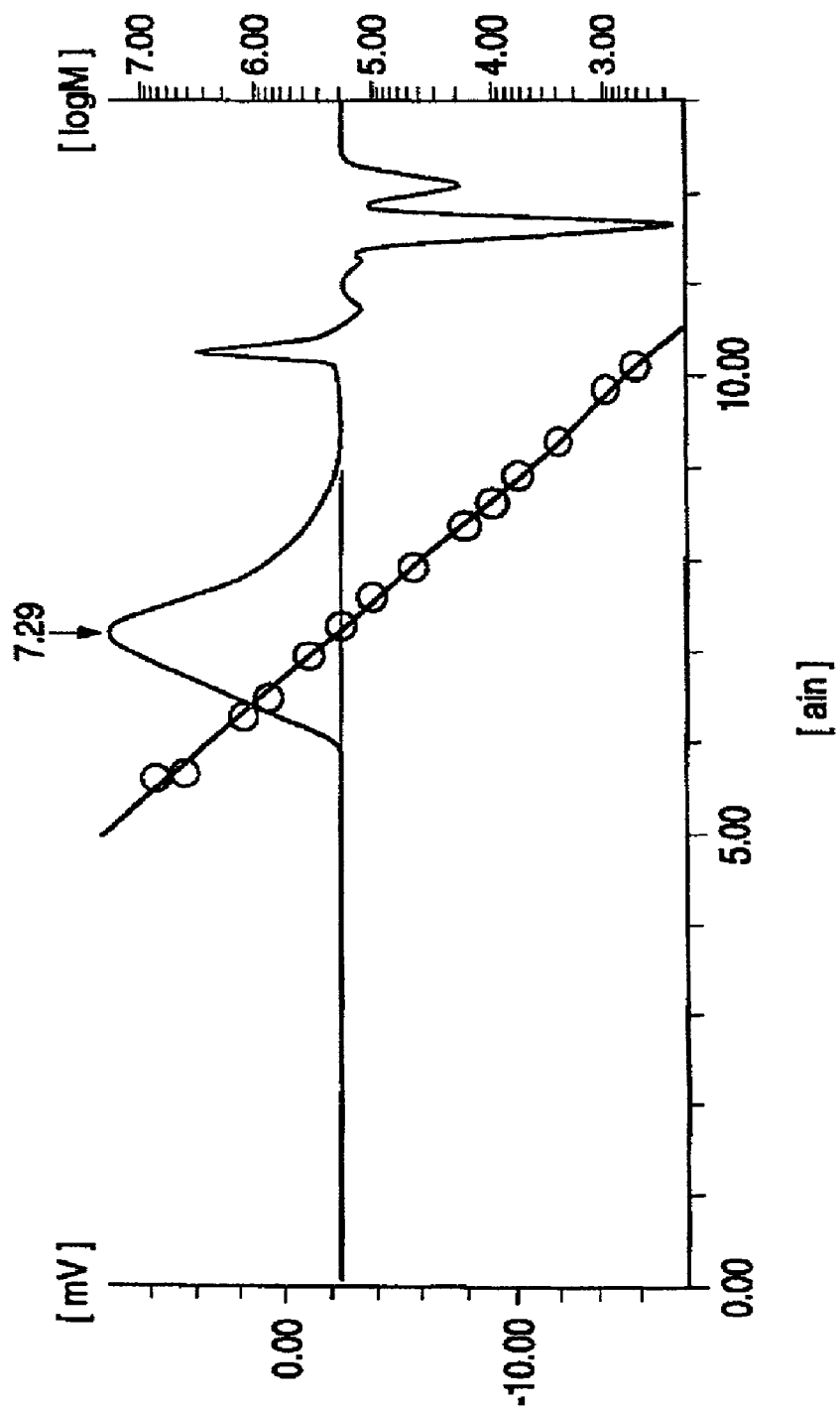
FIG. 3 is a graph showing a GPC spectrum of a polymer compound obtained in Example 1.

The resulting polymer compound is measured for molecular weight distribution by using a gel permeation chromatography (HLC 8020, produced by Tosoh Corp.). The resulting GPC spectrum is shown in FIG. 3, and the weight average molecular weight and the molecular weight distribution (obtained by dividing the weight average molecular weight $M_w$ by the number average molecular weight $M_n$) are shown in Table 5.

Measurements of Tensile Strength and Izod Impact Strength

A resulting polymer compound (in a solid state) is molded by extrusion molding by using a melt extrusion molding apparatus (Minimax Moluder, produced by ICI) to obtain a dumbbell and an Izod test piece. The tensile strength is measured by using the dumbbell according to JIS K7113, and the Izod impact strength is measured by using the Izod test piece according to JIS K7110. The results obtained are shown in Table 5.

Production of Near Infrared Ray Absorbing Material 10 parts by mass of the resulting polymer compound and 0.02 part by mass of dimmonium compound (IRG-002, produced by Nippon Kayaku Co., Ltd., molecular weight: 1,200) are added to 50 parts by mass of tetrahydrofuran and dispersed in a paint shaker for 60 minutes to prepare a coating composition. A film having a thickness of 0.2 mm is formed by cast molding using the coating composition.

A sample having a size of 5 -cm×5 cm square is cut from an arbitrary position of the resulting film and is then cut into nine aliquots as test pieces. The test pieces each are measured for a spectral transmittance spectrum by using a spectrophotometer (UV4000, produced by Hitachi, Ltd.). A difference ($\Delta T$) between the maximum value and the minimum value in the transmittance at a wavelength of 1,000 am is obtained from the resulting spectrum and is used as an index of dispersion uniformity. The results obtained are shown in Table 6. The smaller value of $\Delta T$ means higher dispersion uniformity of the dimmonium compound in the film.

The film is also measured for transmittance to a visible ray (wavelength: 400 to 700 nm) and a near infrared ray (wavelength: 950 to 1,200 nm) by using a spectrophotometer (uv 4000, produced by Hitachi, Ltd.). A ratio of the average transmittance to a visible ray T1 to the average transmittance to a near infrared ray T2 (T1/T2) is obtained to evaluate characteristics as a transparent near infrared ray absorbing film. The results obtained are shown in Table 6. In Table 6, the larger value of T1/T2 means higher transparency in the visible region and selective absorbance in the near infrared region.

Production of Electroconductive Film 10 parts by mass of the resulting polymer compound and 6 parts by mass of zinc oxide (produced by Tokyo Kasei Kogyo Co., Ltd., molecular weight: 72) as an electroconductive substance are added to 50 parts by mass of tetrahydrofuran and dispersed in a paint shaker for 60 minutes to prepare a coating composition. The coating composition is coated on a surface of a polyester film (A1000, produced by Toyobo Co., Ltd.), which has been subjected to a surface primer treatment, to form a film having a thickness of 0.5 mm.

The surface resistance of the resulting film is measured by the four-terminal method. The results obtained are shown in Table 6.

EXAMPLE 2

A polymer compound is synthesized in the same manner as in Example 1 except that a diol represented by the following structural formula (9) is used instead of the diol represented by the structural formula (7), and a vinyl-substituted diol represented by the following structural formula (10) instead of the vinyl-substituted diol represented by the structural formula (8). The weight average molecular weight and the $M_w/M_n$ are shown in Table 5.

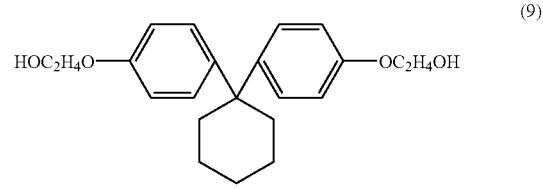

(9)

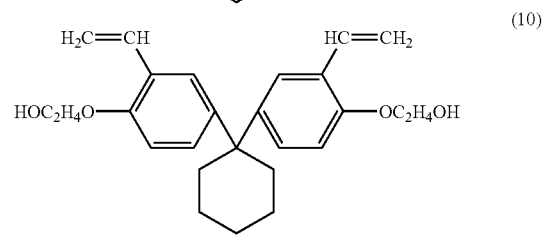

(10)

The measurements of a tensile strength and an Izod impact strength are carried out for the resulting polymer compound in the same manner as in Example 1. The results obtained are shown in Table 5.

The production of a near infrared ray absorbing material and the measurement of a spectral transmittance spectrum therefor, and the production of an electroconductive film and the measurement of a surface resistance therefor are carried out in the same manner as in Example 1 except that the polymer compound obtained in this example is used. The results obtained are shown in Table 6.

EXAMPLE 3

A polymer compound is synthesized in the same manner as in Example 1 except that a diol represented by the following structural formula (11) is used instead of the diol represented by the structural formula (7).

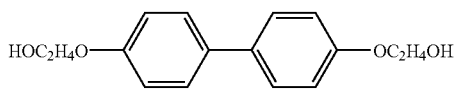

(11)

The measurements of a tensile strength and an Izod impact strength are carried out for the resulting polymer compound in the same manner as in Example 1. The results obtained are shown in Table 5.

The production of a near infrared ray absorbing material and the measurement of a spectral transmittance spectrum therefor, and the production of an electroconductive film and the measurement of a surface resistance therefor are carried out in the same manner as in Example 1 except that the polymer compound obtained in this example is used. The results obtained are shown in Table 6.

EXAMPLE 4

A polymer compound is synthesized in the same manner as in Example 1 except that a diol represented by the following structural formula (12) is used instead of the diol represented by the structural formula (7).

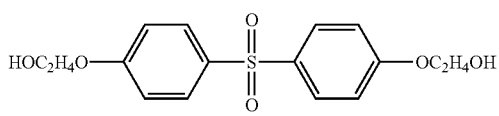

(12)

The measurements of a tensile strength and an Izod impact strength are cared out for the resulting polymer compound in the same manner as in Example 1. The results obtained are shown in Table 5.

The production of a near if ray absorbing material and the measurement of a spectral transmittance spectrum therefor, and the production of an electroconductive film and the measurement of a surface resistance therefor are carried out in the same manner as in Example 1 except that the polymer compound obtained in this example is used. The results obtained are shown in Table 6.

EXAMPLE 5

A polymer compound is synthesized in the same manner as in Example 1 except that a diol represented by the following structural formula (13) is used instead of the diol represented by the structural formula (7).

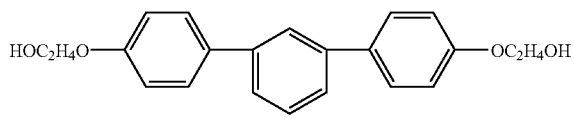

(13)

The measurements of a tensile strength and an Izod impact strength are carried out for the resulting polymer compound in the same manner as in Example 1. The results obtained are shown in Table 5.

The production of a near infrared ray absorbing material and the measurement of a spectral transmittance spectrum therefor, and the production of an electroconductive film and the measurement of a surface resistance therefor are carried out in the same manner as in Example 1 except that the polymer compound obtained in this example is used. The results obtained are shown in Table 6.

EXAMPLE 6

After synthesizing a cyclic oligomer in the same manner as in Example 1, the cyclic oligomer and a by-produced linear oligomer are respectively fractionated from the reaction mixture by using a liquid chromatography mass analyzer (LCMS-prepSTAR, produced by Shimadzu Corp.), and the cyclic oligomer and the linear oligomer are mixed at a molar ratio of 5/95.

Thereafter, 20 g of the resulting mixture is placed in an 100 ml autoclave. The temperature inside the system is raised to 280° C., and the pressure is reduced to 0.4 Torr over 1 hour. After completing the reaction, the contents are dissolved in 1 L of tetrahydrofuran, and the resulting solution is added dropwise to 3 L of methanol. The resulting solid content is filtered off to obtain a polymer compound having a cyclic structure and a linear structure mixed therein. The weight average molecular weight and the $M_w/M_n$ are shown in Table 5.

The measurements of a tensile strength and an Izod impact strength are carried out for the resulting polymer compound in the same manner as in Example 1. The results obtained are shown in Table 5.

The production of a near infrared ray absorbing material and the measurement of a spectral transmittance spectrum therefor, and the production of an electroconductive film and the measurement of a surface resistance therefor are carried out in the same manner as in Example 1 except that the polymer compound obtained in this example is used. The results obtained are shown in Table 6.

EXAMPLE 7

1 mol of dimethyl 2,6-naphthalenedicarboxylate, 0.7 mol of a diol represented by the structural formula (7), 0.03 mol of a acid chloride-substituted diol represented by the following structural formula (14), 0.03 mol of a hydroxyl group-substituted diol represented by the structural formula (15), 1.8 mol of ethylene glycol and 0.001 mol of calcium acetate are placed in a 1 L autoclave. It is confirmed that the contents can be stirred by hand, and then stirring is started at 150 rpm.

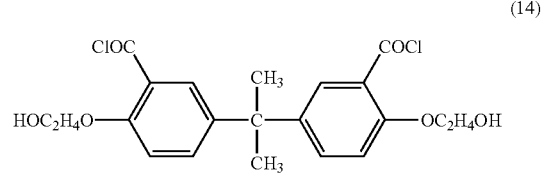

(14)

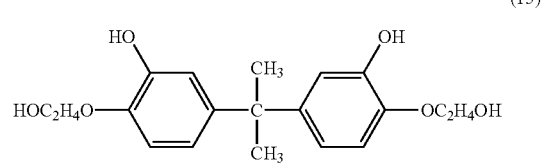

(15)

When the inner temperature of the autoclave is raised at 30° C./hr under sting, methanol is started to be distilled off around 150° C. It is confirmed that 96% of the theoretical amount of methanol is distilled off at 190° C., so as to complete the ester interchange reaction.

0.003 mol of germanium oxide and 0.001 mol of trimethylphosphoric acid are added to the contents of the autoclave, and the temperature is raised from 200° C. at 15° C./hr to 230° C. over 2 hours under stirring at 100 rpm. At this time, the pressure inside the autoclave is decreased to 0.2 Torr over 2 hours. Stirring is further continued at 230° C. at 0.2 Torr for 1 hour to complete the reaction.

The temperature of the contents is decreased to room temperature, to which 1 L of tetrahydrofuran is added and stirred to dissolve them. The resulting solution is added dropwise to methanol, and a solid content thus obtained is filtered off. A cyclic oligomer is separated from the resulting product by using a liquid chromatography mass analyzer (LCMS-prepSTAR, produced by Shimadzu Corp.). The yield is 20 g.

The resulting cyclic oligomer is added to a solution obtained by dissolving 15 g of sodium hydroxide in 500 ml of distilled water in a 5 L flask, and 500 ml of methylene chloride and 0.01 mol of trimethylamine are further added thereto. The mixed liquid is stirred at 5° C. and 400 rpm for 60 hours to carry out an interfacial polymerization reaction. After completing the reaction, the contents are added dropwise to 3 L of methanol, and the solid content thus obtained is filtered off. The resulting crude product is dried in vacuum at 70° C. for 15 hours, so as to obtain the objective polymer compound. The weight average molecular weight and the $M_w/M_n$ are shown in Table 5.

The measurements of a tensile strength and an Izod impact strength are carried out for the resulting polymer compound in the same manner as in Example 1. The results obtained are shown in Table 5.

The production of a near infrared ray absorbing material and the measurement of a spectral transmittance spectrum therefor, and the production of an electroconductive film and the measurement of a surface resistance therefor are carried out in the same manner as in Example 1 except that the polymer compound obtained in this example is used. The results obtained are shown in Table 6.

COMPARATIVE EXAMPLE 1

In Comparative Example 1, a commercially available linear polyester resin (Vylon RV200 mad by Toyobo Co., Ltd.) is used. The weight average molecular weight and the $M_w/M_n$ of the polyester resin are shown in Table 5.

The measurements of a tensile strength and an Izod impact strength are carried out for the polyester resin in the same manner as in Example 1. The results obtained are shown in Table 5.

The production of a near infrared ray absorbing material and the measurement of a spectral transmittance spectrum therefor, and the production of an electroconductive film and the measurement of a surface resistance therefor are earned out in the same manner as in Example 1 except that the polyester resin is used. The results obtained are shown in Table 6.

COMPARATIVE EXAMPLE 2

In Comparative Example 2, the polyester resin used in Comparative Example 1 is crosslinked with a crosslinking agent (Coronate L, produced by Nippon Polyurethane Industry Co., Ltd., addition amount: 1% by mass), so as to obtain a crosslinked polymer compound.

Using the thus obtained polyester resin, the measurements of a tensile strength and an Izod impact strength are tried in the same manner as in Example 1, but the measurements cannot be completed because the obtained polyester resin cannot melt and a test piece cannot be molded by the melt extrusion molding apparatus. The results obtained for the molecular weight are shown in Table 5.

COMPARATIVE EXAMPLE 3

A crosslinked polymer compound is synthesized in the same manner as in Comparative Example 2 except that the addition amount of the crosslinking agent is changed to 5% by mass.

Using the thus obtained polymer compound, the measurements of a tensile strength and an Izod impact strength are tried in the same manner as in Example 1, but the measurements cannot be completed because the obtained polymer compound cannot melt and a test piece cannot be molded by the melt extrusion molding apparatus. The results obtained for the molecular weight are shown in Table 5.

COMPARATIVE EXAMPLE 4

1 mol of dimethyl 2,6-naphthalenedicarboxylate, 0.7 mol of a diol represented by the following structural formula (6), 1.8 mol of ethylene glycol and 0.001 mol of calcium acetate are placed in a 1 L autoclave. After raising the inner temperature to 130° C., it is confirmed that the contents can be stirred by hand, and then stirring is started at 150 rpm.

When the inner temperature is raised at 30° C./hr, methanol is started to be distilled off around 150° C. It is confirmed that 99% of the theoretical amount of methanol is distilled off at 240° C., so as to complete the ester interchange reaction.

0.002 mol of germanium oxide and 0.001 mol of trimethylphosphoric acid are added to the contents of the autoclave, and the temperature is raised from 240° C. at 15° C./hr to 270° C. over 2 hours under stirring at 100 rpm. At this time, the pressure inside the autoclave is decreased to 0.4 Torr over 2 hours. Stirring is further continued at 270° C. at 0.4 Torr for 1 hour to complete the reaction.

Figure 4:
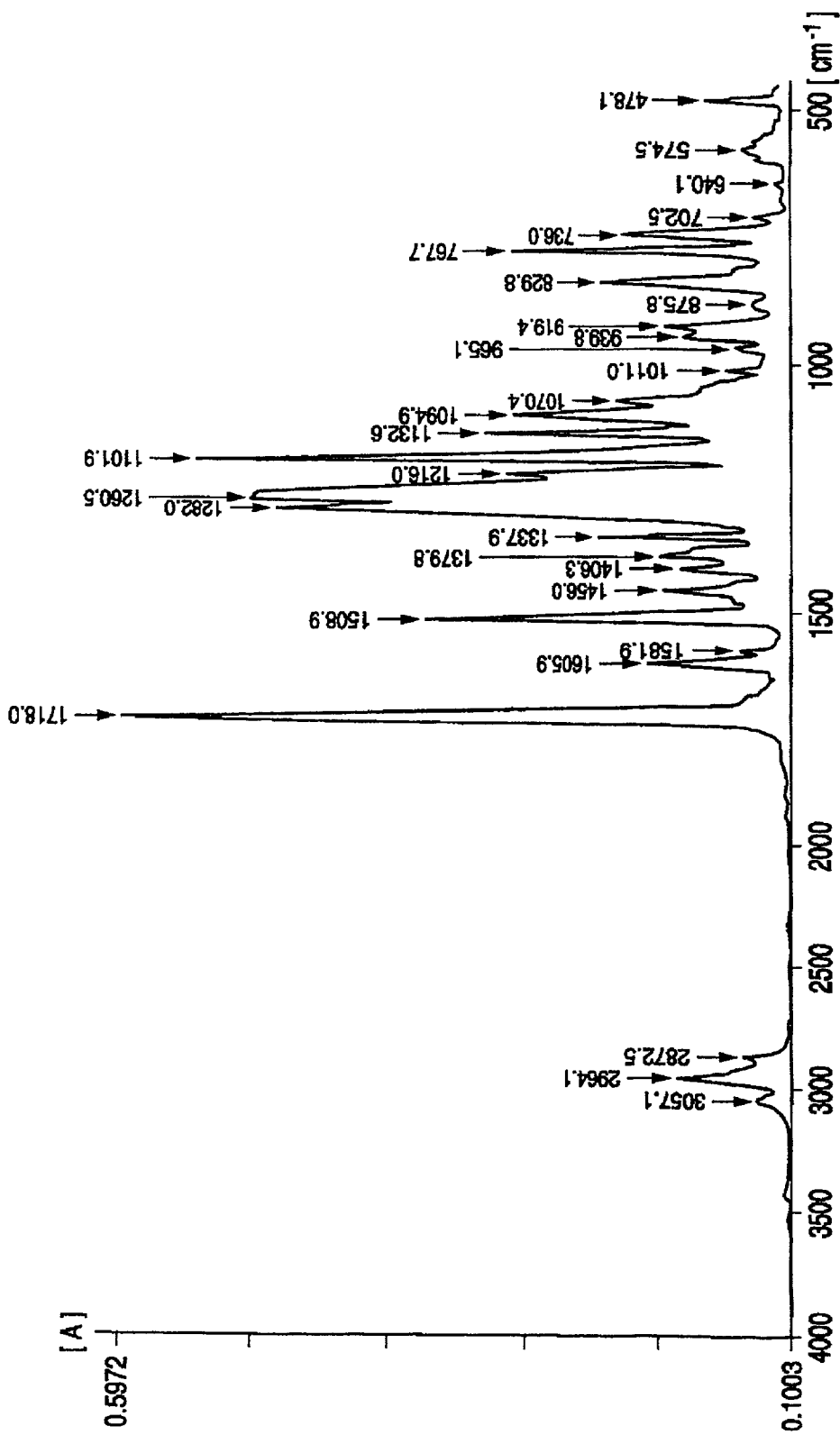
FIG. 4 is a graph showing an IR spectrum of a polymer compound obtained in Comparative Example 2.

The temperature of the contents is decreased to room temperature, to which 1 L of tetrahydrofuran is added and stirred to dissolve them. The resulting solution is added dropwise to methanol, and a solid content thus obtained is filtered off to obtain a polymer compound. The IR spectrum of the resulting polymer compound is shown in FIG. 4, and the weight average molecular weight and the $M_w/M_n$ are shown in Table 5.

The measurements of a tensile strength and an Izod impact strength are carried out for the resulting polymer compound in the same manner as in Example 1. The results obtained are shown in Table 5.

The production of a near infrared ray absorbing material and the measurement of a spectral transmittance spectrum therefor, and the production of an electroconductive film and the measurement of a surface resistance therefor are carried out in the same manner as in Example 1 except that the resulting polymer compound is used. The results obtained are shown in Table 6.

TABLE 5

|  | Weight average molecular weight | $M_w/M_n$ | Tensile strength (MPa) | Izod impact strength $(kJ/m^2)$ |
|---|---|---|---|---|
| Example 1 | 98,000 | 3.1 | 245 | $1.30 \times 10^5$ |
| Example 2 | 87,000 | 3.8 | 226 | $9.80 \times 10^4$ |
| Example 3 | 65,000 | 3.6 | 382 | $1.45 \times 10^5$ |
| Example 4 | 85,000 | 3.4 | 235 | $1.32 \times 10^5$ |
| Example 5 | 48,000 | 3.9 | 255 | $1.24 \times 10^5$ |
| Example 6 | 28,000 | 2.8 | 76.5 | $7.90 \times 10^4$ |
| Example 7 | 78,000 | 3.9 | 226 | $1.00 \times 10^5$ |
| Comparative Example 1 | 45,000 | 2.1 | 43.1 | $6.50 \times 10^4$ |
| Comparative Example 2 | 185,000 | 7.5 | — | — |
| Comparative Example 3 | 220,000 | 10.1 | — | — |
| Comparative Example 4 | 74,000 | 2.2 | 45.1 | $4.80 \times 10^4$ |

TABLE 6

|  | Dispersion uniformity ($\Delta T$ (%)) | Wavelength-selective absorbance | | | Surface resistance $(\Omega/cm^2)$ |
|---|---|---|---|---|---|
|  |  | $T_1$ (%) | $T_2$ (%) | $T_1/T_2$ |  |
| Example 1 | 0.7 | 80 | 5 | 16.0 | 20 |
| Example 2 | 0.6 | 80 | 4 | 20.0 | 20 |
| Example 3 | 0.7 | 78 | 6 | 13.0 | 17 |
| ExamplE 4 | 0.6 | 76 | 7 | 10.9 | 19 |
| Example 5 | 0.8 | 78 | 6 | 13.0 | 15 |
| Example 6 | 2.4 | 79 | 7 | 11.3 | 24 |
| Example 7 | 0.6 | 79 | 5 | 15.8 | 20 |
| Comparative Example 1 | 8.2 | 65 | 24 | 2.7 | 120 |
| Comparative Example 4 | 12.5 | 64 | 22 | 2.9 | 125 |

As shown Table 5, it is confirmed that the polymer compounds in Examples 1 to 7 according to the invention have sufficiently high mechanical strengths. In particular the polymer compounds in Examples 1 to 5 and 7 exhibit larger measurement values for tensile strength than those of Comparative Examples 1 and 4 and have measurement values equivalent to or larger than them for Izod impact strength.

As shown in Table 6, the molded articles obtained by using the polymer compounds of Examples 1 to 7 exhibit sufficiently high dispersion uniformity of the functional material and achieve various characteristics at high levels in near infrared ray absorbance, transparency in the visible region and electroconductivity.

As described in the foregoing, the polymer compound of the invention is excellent in mechanical strength and can sufficiently uniformly disperse a functional material. According to the process for producing a polymer compound of the inventions the polymer compound of the invention having such excellent characteristics can be easily and certainly produced.

The molded article of the invention using the polymer compound of the invention is excellent in mechanical strength and molding property. In the case where the molded article of the invention contains a functional material sufficiently high dispersion uniformity is realized, whereby desired characteristics can be easily obtained at a high level. According to the process for producing a molded article of the invention, the molded article of the invention having such excellent characteristics can be easily and certainly produced.

The entire disclosure of Japanese Patent Application No. 2001-180555 filed on Jun. 14, 2001 including specification, claims, drawings and abstract is incorporated herein by reference in its entirety.

What is claimed is:

1. A polymer compound comprising a cyclic structure represented by the following general formula (1):

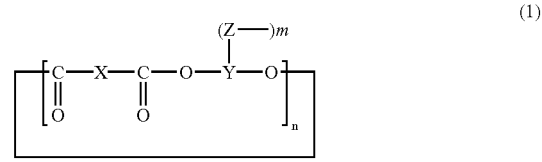

wherein X represents a group selected from the group consisting of an alkylene group, an arylene group, an arylalkylene group, an alkylarylene group, halogenated alkylene group and halogenated arylene group; Y represents a group selected from the group consisting of an alkylene group, an arylene group, an arylalkylene group, an alkylarylene group, a halogenated alkylene group and a halogenated arylene group; Z represents a connecting group derived from an alkylene group having from 1 to 20 carbon atoms, an ester group, a urethane group, an amide group or an ether group, which connects the Y of the cyclic structure to a group represented by Y belonging to at least a second cyclic structure of general formula (1); m represents 0 or an integer of 1 or more; and n represents an integer of 2 or more, provided that m is independently selected for each respective repeating unit within the cyclic structure, and a total number of connecting groups represented by Z in the cyclic structure is 1 or more.

2. A polymer compound as claimed in claim 1, wherein the cyclic structure is represented by the following general formula (2):

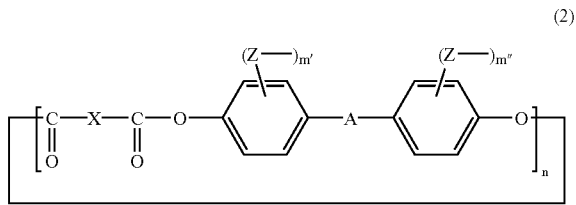

(2)

wherein X and A are the same as or different from each other and each represents a group selected from the group consisting of an alkylene group, an arylene group, an arylalkylene group, an alkylarylene group, halogenated alkylene group and halogenated arylene group; Z represents a connecting group derived from an alkylene group having from 1 to 20 carbon atoms, an ester group, a urethane group, an amide group or an ether group, which connects the Y of the cyclic structure to a group represented by Y belonging to at least a second cyclic structure of general formula (1); m' and m" each represents an integer of from 0 to 4; and n represents an integer of 2 or more, provided that m' and m" are each independently selected for each respective repeating unit within the cyclic structure, and a total number of connecting groups represented by Z in the cyclic structure is 1 or more.

3. A process for producing a polymer compound comprising the steps of:

a first step for subjecting a raw material mixture to esterification or ester exchange to obtain a composite, the raw material mixture containing a compound represented by the following general formula (3):

(3)

wherein X represents a group selected from the group consisting of an alkylene group, an arylene group, an arylalkylene group, an alkylarylene group, halogenated alkylene group and halogenated arylene group; and R represents a group selected from the group consisting of a hydrogen atom and a hydrocarbon group, and a compound represented by the following general formula (4):

(4)

wherein Y represents a group selected from the group consisting of an alkylene group, an arylene group, an arylalkylene group, an alkylarylene group, halogenated alkylene group and halogenated arylene group; Z' represents a reactive group capable of forming a group selected from the group consisting of an alkenyl group, an ester group, a urethane group, an amide group and an ether group; and k represents an integer of 1 or more, a second step for subjecting the composite to a polycondensation reaction under reduced pressure to obtain a cyclic oligomer represented by the following general formula (5):

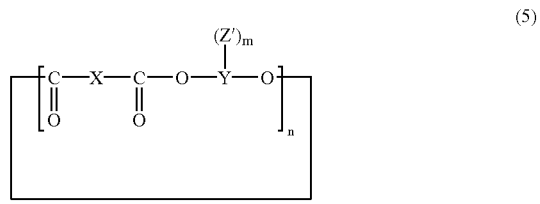

(5)

wherein X represents a group selected from the group consisting of an alkylene group, an arylene group, an arylalkylene group, an alkylarylene group, halogenated alkylene group and halogenated arylene group; Y represents a group selected from the group consisting of an alkylene group, an arylene group, an arylalkylene group, an alkylarylene group, a halogenated alkylene group and a halogenated arylene group; Z' represents a reactive group capable of forming a group selected from the group consisting of an alkenyl group, an ester group, a urethane group, an amide group and an ether group; m represents 0 or an integer of 1 or more; and n represents an integer of 2 or more, provided that m is independently selected for each respective repeating unit within the cyclic structure, and a total number of reactive groups represented by Z' in the cyclic oligomer is 1 or more, and a third step for reacting the oligomer to obtain a polymer compound having a cyclic structure represented by the following general formula (1):

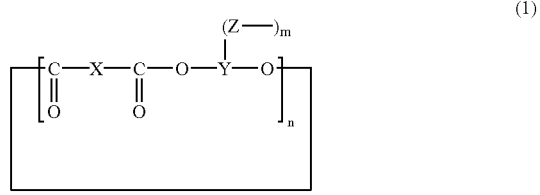

(1)

wherein X represents a group selected from the group consisting of an alkylene group, an arylene group, an arylalkylene group, an alkylarylene group, halogenated alkylene group and halogenated arylene group; Y represents a group selected from the group consisting of an alkylene group, an arylene group, an arylalkylene group, an alkylarylene group, a halogenated alkylene group and a halogenated arylene group; Z represents a bond derived from an alkylene group having from 1 to 20 carbon atoms, an ester group, a urethane group, an amide group or an ether group, which connects the Y of the cyclic structure to a group represented by Y belonging to at least a second cyclic structure of general formula (1); m represents 0 or an integer of 1 or more; and n represents an integer of 2 or more, provided that m is independently selected for each respective repeating unit within the cyclic structure, and a total number of the connecting groups represented by Z in the cyclic structure is 1 or more.

4. A molded article comprising a polymer compound comprising a cyclic structure represented by the following general formula (1):

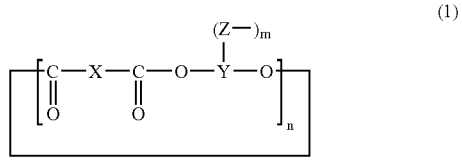

wherein X represents a group selected from the group consisting of an alkylene group, an arylene group, an arylalkylene group, an alkylarylene group, halogenated alkylene group and halogenated arylene group; Y represents a group selected from the group consisting of an alkylene group, an arylene group, an arylalkylene group, an alkylarylene group, a halogenated alkylene group and a halogenated arylene group; Z represents a bond derived from an alkylene group having from 1 to 20 carbon atoms, an ester group, a urethane group, an amide group or an ether group, which connects the Y of the cyclic structure to a group represented by Y belonging to at least a second cyclic structure of general formula (1); m represents 0 or an integer of 1 or more; and n represents an integer of 2 or more, provided that m is independently selected for each respective repeating unit within the cyclic structure, and a total number of the connecting groups represented by Z in the cyclic structure is 1 or more.

5. A molded article as claimed in claim 4, wherein the molded article is produced by extrusion molding.

6. A molded article as claimed in claim 4, wherein the molded article is produced by coating molding.

7. A molded article as claimed in claim 4, wherein the molded article further comprising a functional material.

8. A molded article as claimed in claim 7, wherein the functional material exhibits electroconductivity.

9. A molded article as claimed in claim 7, wherein the functional material exhibits wavelength-selective absorbance.

10. A process for producing a molded article comprising the steps of:

melting a polymer compound comprising a cyclic structure represented by the following general formula (1):

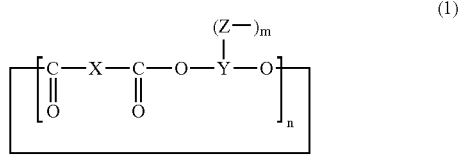

wherein X represents a group selected from the group consisting of an alkylene group, an arylene group, an arylalkylene group, an alkylarylene group, halogenated alkylene group and halogenated arylene group; Y represents a group selected from the group consisting of an alkylene group, an arylene group, an arylalkylene group, an alkylarylene group, a halogenated alkylene group and a halogenated arylene group; Z represents a bond derived from an alkylene group having from 1 to 20 carbon atoms, an ester group, a urethane group, an amide group or an ether group, which connects the Y of the cyclic structure to a group represented by Y belonging to at least a second cyclic structure of general formula (1); m represents 0 or an integer of 1 or more; and n represents an integer of 2 or more, provided that m is independently selected for each respective repeating unit within the cyclic structure, and a total number of the connecting groups represented by Z in the cyclic structure is 1 or more, and subjecting the molten polymer compound to extrusion molding.

11. A process for producing a molded article by coating molding, comprising the steps of:

coating a coating composition containing a polymer compound comprising a cyclic structure represented by the following general formula (1):

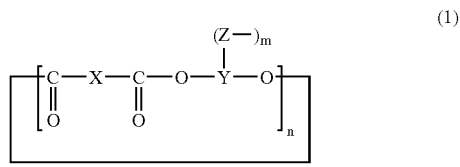

wherein X represents a group selected from the group consisting of an alkylene group, an arylene group, an arylalkylene group, an alkylarylene group, halogenated alkylene group and halogenated arylene group; Y represents a group selected from the group consisting of an alkylene group, an arylene group, an arylalkylene group, an alkylarylene group, a halogenated alkylene group and a halogenated arylene group; Z represents a connecting group derived from an alkylene group having from 1 to 20 carbon atoms, an ester group, a urethane group, an amide group or an ether group, which connects the Y of the cyclic structure to a group represented by Y belonging to at least a second cyclic structure of general formula (1); m represents 0 or an integer of 1 or more; and n represents an integer of 2 or more, provided that m is independently selected for each respective repeating unit within the cyclic structure, and a total number of connecting groups represented by Z in the cyclic structure is 1 or more, and drying the coating composition to form a molded article.

12. A process for producing a molded article as claimed in claim 11, where the coating composition further contains a functional material.

13. A process for producing a molded article as claimed in claim 12, wherein the functional material exhibits electroconductivity.

14. A process for producing a molded article as claimed in claim 12, wherein the functional material exhibits wavelength-selective absorbance.

\* \* \* \* \*